July 6, 1954  W. P. DALRYMPLE  2,682,788
POWER TRANSMISSION
Filed Aug. 1, 1951  4 Sheets-Sheet 1

Inventor
William P. Dalrymple
By Wallace and Cannon
Attorneys

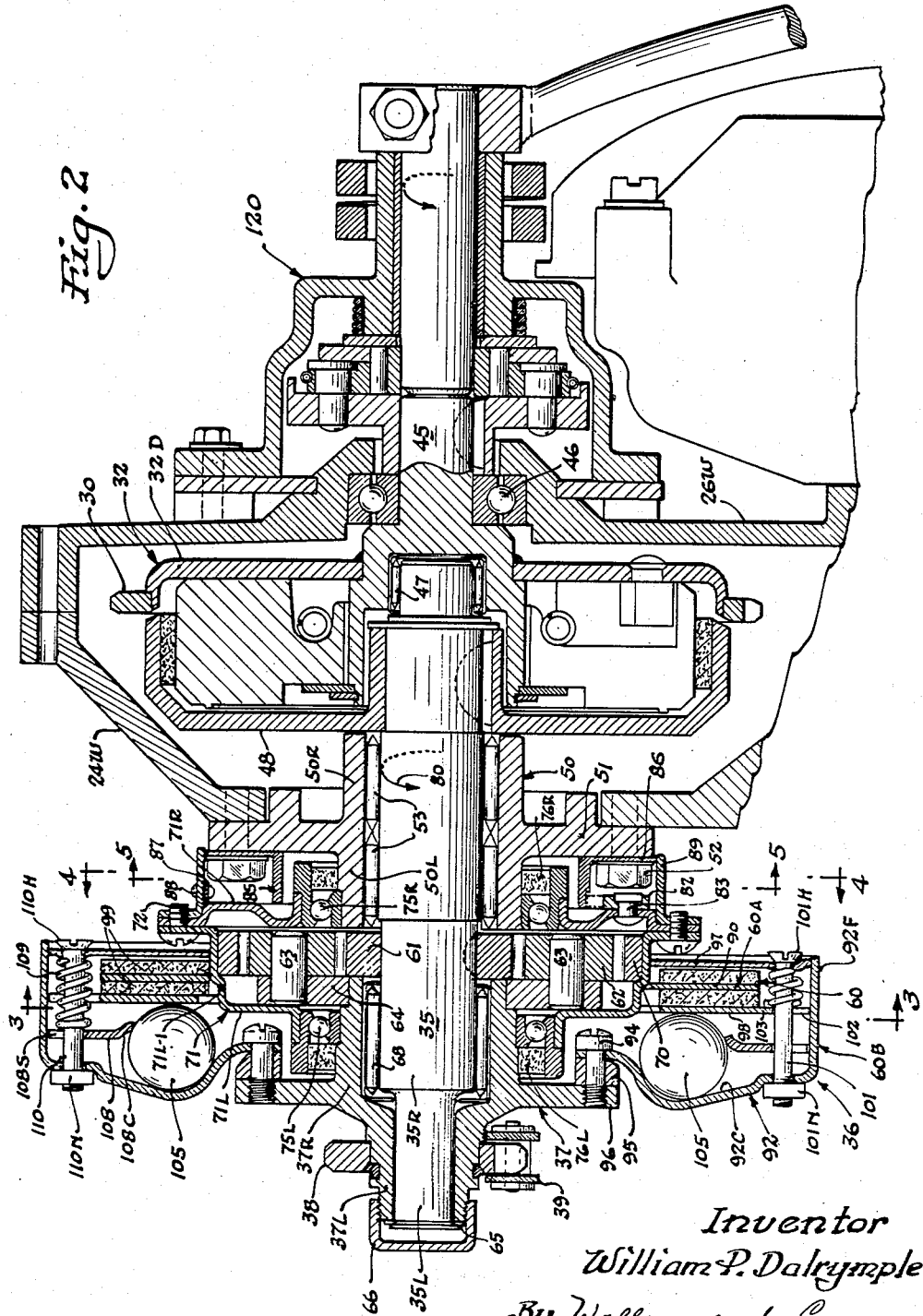

July 6, 1954 W. P. DALRYMPLE 2,682,788
POWER TRANSMISSION
Filed Aug. 1, 1951 4 Sheets-Sheet 3

Inventor
William P. Dalrymple
By Wallace and Cannon
Attorneys

July 6, 1954   W. P. DALRYMPLE   2,682,788
POWER TRANSMISSION
Filed Aug. 1, 1951   4 Sheets-Sheet 4
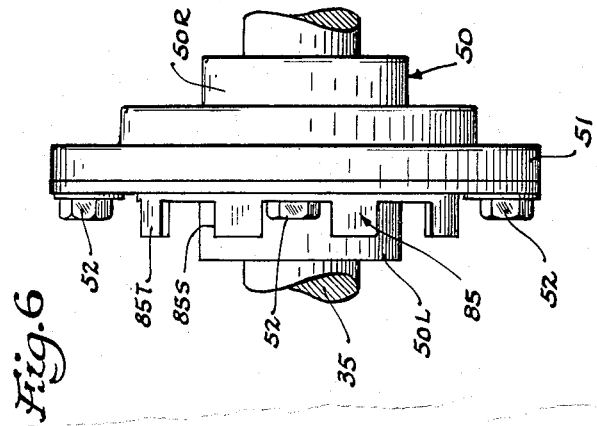
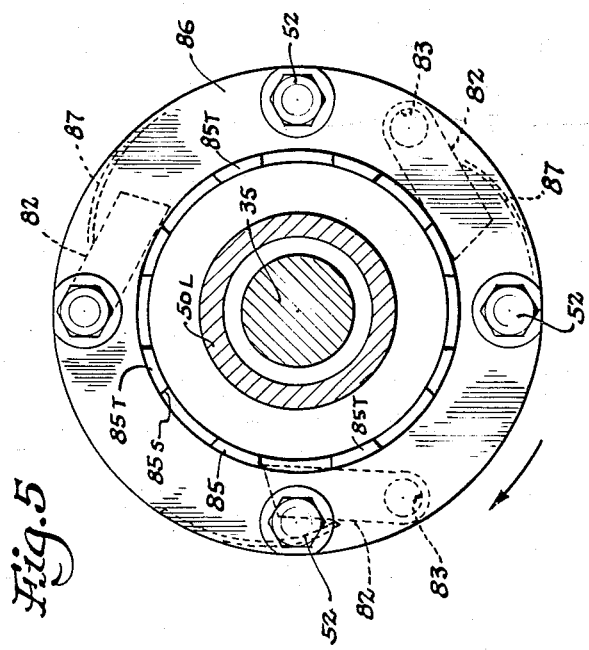
Inventor
William P. Dalrymple
By Wallace and Cannon
Attorneys Patented July 6, 1954

2,682,788

UNITED STATES PATENT OFFICE 2,682,788

POWER TRANSMISSION

William P. Dalrymple, Rochester, N. Y., assignor to American Brake Shoe Company, Wilmington, Del., a corporation of Delaware Application August 1, 1951, Serial No. 239,788

2 Claims. (Cl. 74—752)

This invention relates to power transmission mechanisms for transmitting driving power, and particularly the invention relates to variable speed transmission mechanisms adapted for use on wheeled vehicles such as motorcycles and tricycles, and the like.

In my co-pending application, Serial No. 183,-177, filed September 5, 1950, there was disclosed a power unit that is particularly adapted for use as the propulsion means in a wheeled vehicle such as a bicycle or tricycle, and the power transmission mechanism of the present invention is particularly intended and adapted to serve in the power unit that is disclosed in my aforesaid co-pending application.

In power units of the aforesaid character, it is desirable that the power transmission from the driving engine to the driven wheel be capable of assuming different speed ratios and to enable this to be accomplished by means of a simple and effective character is the primary object of the present invention. In power units of the aforesaid character, the driving engine must of course be disconnected from the driven wheel when a manually starting force is applied to the engine, and another important object of the present invention is to afford a transmission mechanism where the driving engine is thus disconnected automatically when the vehicle is stopped.

Other important objects of the present invention are to provide a power transmission mechanism in which the driving power from the driving engine is first connected to a change-speed mechanism and is then applied through different and increasing drive ratios as the speed of the vehicle increases, and to accomplish the change in ultimate driving ratios in a smooth and gradual manner.

Another object of the present invention is to afford a change-speed mechanism that is automatic in character and which is capable of manufacture at a reasonable cost.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 2 is an enlarged horizontal cross sectional view showing the power transmission mechanism;

Fig. 5 is a sectional view taken substantially along the line 5—5 in Fig. 2; and Fig. 6 is a fragmental side elevational view of the reaction plate of the transmission mechanism.

Figure 1:
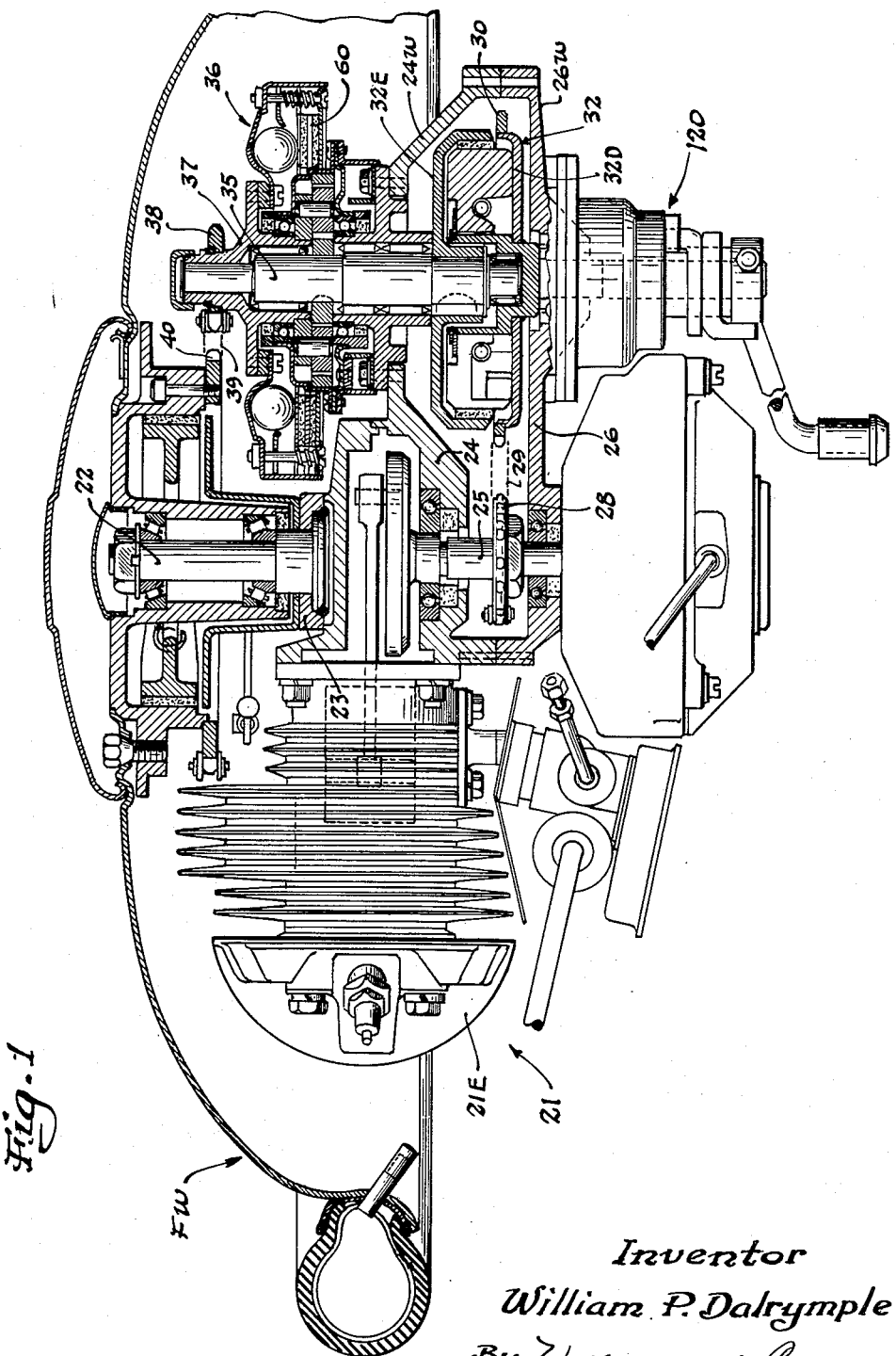
Fig. 1 is a horizontal sectional view through a power unit embodying a transmission mechanism constructed in accordance with the present invention.
Figure 4:
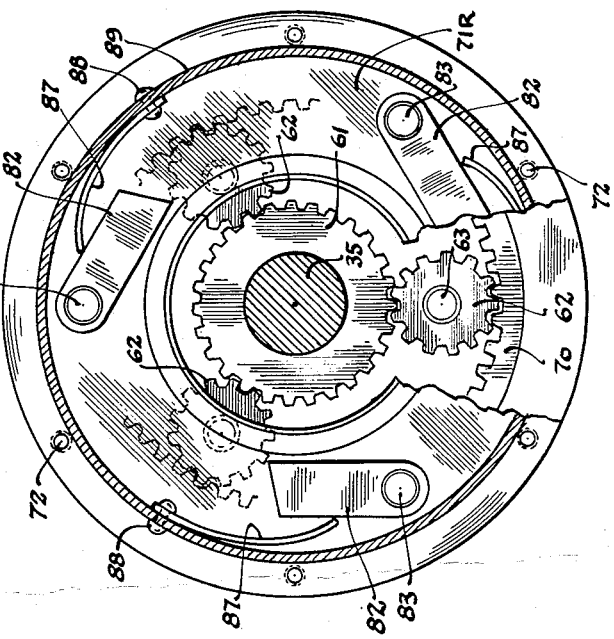
Fig. 4 is a sectional view taken substantially along the line 4—4 of Fig. 2.

For purposes of disclosure the present invention is illustrated as embodied in a power unit 21 that is located primarily within the periphery of a wheel FW and which power unit is operable to impart rotative driving force to the wheel FW. The power unit 21 as herein illustrated is in many of its aspects similar in form and construction to the power unit shown in my aforesaid co-pending application, and reference may be had to such co-pending application for these details of construction and relationship. In the present instance, it is sufficient to point out that the wheel FW is rotatably mounted on an axle 22 that extends laterally or horizontally in one direction from one side of a center strut 23 which, as described in my aforesaid co-pending application, may extend upwardly and may be mounted in the steering column of a bicycle or tricycle frame so that the wheel FW constitutes the front wheel of such a vehicle. On the other or opposite side of the center strut 23 an engine 21E is mounted and this is accomplished by securing one wall of a crank case 24 to the center strut 23 as described in my aforesaid co-pending application. The engine 21E is of the internal combustion type and serves to drive a crank shaft 25 that extends outwardly from the other side of the crank case 24 and into a transmission housing 26 that is formed in part by a wall 26W and in part by a wall of the crank case 24 and an extension 24W of such wall.

The present invention is concerned with the power transmission and control between the crank shaft 25 and the wheel FW, and it is in this respect that the present structure differs from the unit shown in my aforesaid co-pending application. Thus it will be observed that within the transmission housing 26, the crank shaft 25 has a sprocket 28 fixed thereon and a chain 29 connects this sprocket with a sprocket 30 that is fixed on the driven member of a primary centrifugal clutch 32 that forms an element of the transmission of the present invention. The sprocket 30 is mounted on a drive plate 32D that forms the driving element of the clutch 32, and this clutch also has a clutch drum 32E that is fixed on an output shaft 35. The output shaft 35 serves as the driving element of a change-speed gear mechanism 36, the output element 37 of which has a sprocket 38 thereon that is connected by a chain 39 to a sprocket 40 fixed to the wheel FW so that the wheel FW may be driven by the power transmission from the engine 21E.

The primary clutch 32 is disclosed in detail in my co-pending application, Serial No. 239,789, filed August 1, 1951, and reference may be had to such co-pending application for details of structure and operation of this primary clutch. It may pointed out, however, that this primary clutch is arranged to engage gradually and at a relatively low speed and embodies means which maintain the primary clutch 32 in its engaged relationship until the speed of the clutch 32 has reduced somewhat below its initial engagement speed, this being particularly true where the clutch is operating under load.

The clutch 32 has a driving element 32D thereof, mounted on a driving shaft 45 that is supported by ball bearings 46 in the wall 26W of the transmission housing, and the driven shaft 35 has its right-hand end, as viewed in Fig. 2, rotatably supported within a recessed end of the driving shaft 45 by means including a needle bearing 47. The shaft 35 extends to the left from the needle bearing 47 and has a clutch drum 48 keyed thereto, such clutch drum constituting the driven element of the clutch 32. To the left of the clutch drum 48, as viewed in Fig. 2, the shaft 35 extends through a bearing sleeve 50 that is formed in a bearing plate 51 which is secured by means of cap screws 52 across an opening in the extension 24W of the crank case wall, and the mounting plate 51 is parallel to the wall 26W of the transmission housing. The driven shaft 35 is supported in the bearing sleeve 50 by means of a pair of needle bearings 53, as will be evident in Fig. 2 of the drawings. It should be observed that the sleeve 50 extends in both directions from the plate 51, these oppositely projecting portions of the sleeve 50 being identified as 50L and 50R in Fig. 2 of the drawings. Beyond the left end of the sleeve section 50L, variable speed transmission unit 36 is operatively associated with the shaft 35, as will now be described in detail.

Considered in a broad sense, the variable speed transmission 36 is afforded by a planetary gear system, the driving or transmitting ratio of which is arranged to be automatically varied and controlled by means of a centrifugally engaged friction clutch 60 that is relatively large in diameter so that a large frictional area is afforded, and this is quite important in the present mechanism in that it permits proper and smooth operation throughout a range of slippage of friction clutch elements. The effectiveness of this structure in this respect is due in a large part to the large radiating surface afforded in the large diameter friction clutch 60 whereby the heat caused by slippage may be effectually dissipated. Considering the mechanism more specifically, it should be observed that the planetary gear system embodies a sun gear 61 carried on and keyed to the shaft 35 just to the left of the sleeve section 50L, and this sun gear is arranged to mesh with a plurality of planet gears 62 that are rotatably mounted on studs 63 at circumferentially spaced points on a planet carrier 64. This planet carrier 64 is fixed to the output element 37 of the unit, and in this respect it will be noted that the output element 37 is in the nature of a stepped sleeve having sections 37R and 37L. The shaft 35 also has a stepped formation, the left one of which is identified as 35L and this section 35L is the smallest of the step-sections of this shaft. The section 37L of the output element 37 rotatably surrounds the section 35L and is held against displacement in a left-hand direction by a C-washer or ring 65 that is engaged with a suitable annular groove in the end of the shaft, and a prospective cap 66 encloses this ring. The section 37L of the output element 37 serves as a mounting for the sprocket 38, while the section 37R surrounds a somewhat larger section 35R of the shaft 35, and a needle bearing 68 supports the output element 37 rotatably with respect to the shaft 35.

Figure 3:
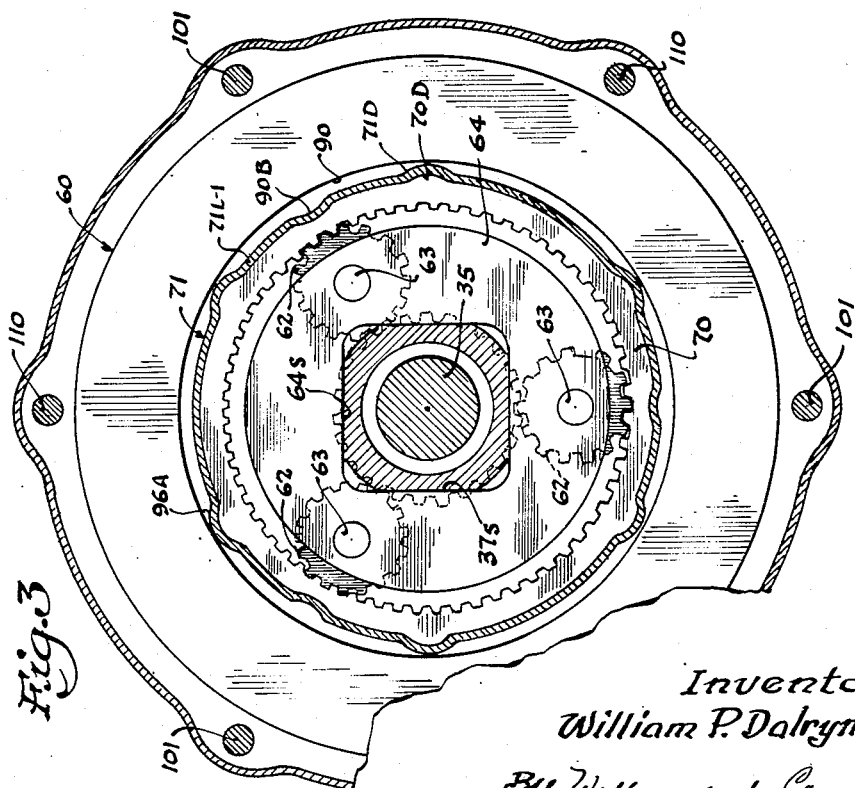
Fig. 3 is a vertical sectional view taken substantially along the line 3—3 of Fig. 2.

In attaining the desired mounting of the planet carrier 64 on the output element 37, the right-hand end of the sleeve section 37R is externally squared as at 37S, Fig. 3, and the planet carrier 64 has a complemental squared opening 64S formed therein so that this planet carrier 64 may be slipped into position on the squared section 37S so as to rotatively connect the planet carrier 64 and the driven element 37.

The planetary transmission also includes a ring gear 70 that surrounds and meshes with the several planet gears 62, and this ring gear 70 is rotatably supported in what amounts to a supporting housing 71. This housing is formed primarily by a pair of generally annular sheet metal stampings 71L and 71R which at their outer edges are connected together by means including a plurality of screws 72. The stamping 71L is arranged to have a drum-like annular section 71L–1 so that the two stampings 71L and 71R at their innermost radial portions are spaced apart a considerable distance in an axial sense, and thus an annular chamber is formed within the housing in which portions of the planet carrier and portions of the planet gears are housed along with the ring gear 70 which, as will be described, is rotatively interlocked with the housing 71. Thus, as will be evident in Fig. 3, the drum-like section 71L–1 of the ring gear housing is formed with a plurality of transverse ribs 71D at annularly spaced points, and the ring gear 70 has a plurality of complemental and outwardly projecting ribs or lugs 70D that fit into the grooves formed on the inside surfaces of the ribs 71D.

The ring gear housing 71 is rotatively supported so as to be centered at all times upon the axis of the shaft 35, and to accomplish this, a bearing 75R in the nature of a ball bearing is interposed between the inner edge of the stamping 71R and the sleeve section 50L, while a second ball bearing 75L is interposed between the inner edge of the housing section 71L and the sleeve section 37R of the output element 37. In the present instance, dust retaining rings 76R and 76L are provided outwardly of the bearings 75R and 75L.

In Fig. 2 of the drawings, an arrow 80 is shown in respect to the shaft 35 to indicate its forward direction of rotation, and when such rotation is imparted to the shaft 35 and the sun gear 61, the forces effective in the planetary gear, when there is a retarding force or load on the output element 37, tend to rotate the ring gear 70 in a reverse direction, and means are afforded for preventing such reverse rotation of the ring gear 70 while at the same time permitting forward rotation of the ring gear when this is desired, as will hereinafter be described. In the transmission as herein shown, the means for preventing such reverse rotation of the ring gear 70 are afforded by a plurality of pawls 82 that are pivoted by means of studs 83 on the right-hand face of the housing section 71R, it being noted that these pivot studs 83 are parallel to the axis of the shaft 35. The pawls 82 may thus pivot inwardly about their pivot studs 83 and against the outer edge of a stationary or non-rotating abutment ring 85, such abutment ring having a mounting flange 86 that is held in place against the left-hand face of the mounting plate 51 by the cap screws 52. The ring 85 is formed to afford a plurality of teeth 85T, and these teeth are separated by slots 85S. As will be evident in Fig. 5, any reverse rotation of the ring gear housing 71 will cause one of the pawls 82 to enter one of the slots 85S so as to engage one of the teeth 85T, thus to hold the ring gear housing 71 against reverse rotation. In this respect it will be observed that the spacing of the pawls 82 and the teeth 85 is such that only one of the pawls 80 will normally move into its effective position, it having been found that a single pawl will serve in attaining the desired restraining action, and by this arrangement a shorter range of possible reverse movement of the ring gear is attained. The several pawls 82 are urged toward their effective positions by individual leaf springs 87 that are secured by rivets 88 in a mounting ring 89 that is drum-like in character and which is secured to the housing 70 by the screws 72 as will be evident in Fig. 2 of the drawings. The ring 89 overlies the flange 86 of the abutment member 85 so as to afford a dust guard in respect to the enclosed mechanism.

The friction clutch 60 has one element 60A that is fixed in a rotative sense with respect to the ring gear housing 71 while the other element 60B of the friction clutch is fixed in a rotative sense to the output element 37 so that by effecting frictional connection of the elements 60A and 60B of the friction clutch 60, the ring gear 70 may be drivingly coupled to the output element 37 so as to rotate in a forward direction with the output element 37. When this takes place, the speed reducing action of the planetary gear system is nullified and there is in effect a direct drive from the shaft 35 to the output element 37. In intermediate stages of engagement of the friction clutch 60, or in other words when the friction clutch 60 is slipping, the speed of the ring gear 70 in a forward direction may vary in accordance with the degree of clutch slippage in an infinite sense between zero velocity in a forward direction and a velocity that is equal to the velocity of the driven element 37. This correspondingly produces an infinite and gradual variation in the output speed between the maximum speed reduction of the planetary gearing and a direct or one-to-one drive through the unit 36.

Thus, the element 60A of the friction clutch is afforded in part by a plate 90 of circular form that has a central opening therein which surrounds the drum-like portion 71L-1 of the ring gear housing 71, and along the inner edge of this opening tooth-like projections are formed to cooperate with recesses 96B, Fig. 3, on portion 71L-1 and also recesses are formed to cooperate with protuberances 96A on portion 71L-1 whereby, in effect, a splined inner connection with the elements 71D of the drum portion 71L of the ring gear housing is afforded.

In affording the element 60B of the clutch 60, a generally drum-like metal stamping 92 is afforded and at this outer edge this stamping has a flange 92F of cylindrical form which is located so that it completely surrounds the clutch element 60A with a substantial annular space between the flange 92F and the clutch element 60A. The stamping 92 has a wall portion that extends radially inwardly and is secured by cap screws 94 and a spacer ring 95 to a flange 96 that is formed on the driven element 37 so that the stamping or housing element 92 is connected to the driven element 37 for rotation therewith. A pair of clutch plates 97 and 98 are disposed within the flange 92F and on opposite sides of the clutch plate 90, and rings of clutch lining or friction material 99 are fixed on opposite sides of the plate 90 for effecting frictional driving connection between the disc 90 and the two clutch plates 97 and 98. The clutch plates 97 and 98 are secured rotatively to the clutch housing 92 by means of a plurality of headed bolts 101, there being three of these bolts in the present instance, as will be evident in Fig. 3 of the drawings. The bolts 101 extend through appropriate apertures in the plate 97 and through radial slots 102 in the plate 98 as shown in Fig. 2, and each such bolt has a head 101H that engages the left-hand or outer face of the plate 97. The other or left-hand edge of each bolt extends through an opening in the wall of the clutch housing 92 and has a nut 101N fixed thereon so that these bolts 101 serve to limit the right-hand disengaging movement of the right-hand clutch 97. Between the plates 97 and 98 and surrounding the bolts 101, a plurality of springs 103 are afforded, one such spring surrounding each of the bolts 101, and these springs 103 serve to impart separating or clutch releasing forces to the clutch plates 97 and 98.

The clutch 60 has clutch engaging forces applied thereto by a centrifugal action, and for this purpose a plurality of weights in the form of balls 105 are disposed in the clutch housing 92 between the clutch plate 98 and the opposed wall of the clutch housing 92, and the wall of the clutch housing 92 is formed with a sloping cam surface 92C that is so arranged that when the balls 105 move outwardly from their normal inward positions of Fig. 2, such balls are forced along the cam surface 92C and to the right so as to impart clutch closing or engaging movements to the adjacent clutch plate 98. These clutch weights or balls 105 are normally urged in a yielding or resilient manner toward their radially inward or ineffective positions, and this is accomplished in the present instance by a restoring ring 108 that is generally in the form of a plate with its inner edge bent to somewhat conical relationship as at 108C so that the ring may bear toward the right in Fig. 2 against the balls 105 without causing any sharp corners or edges to engage the balls 105.

The return ring 108 is urged resiliently toward the left in Fig. 2 or in a return direction by a plurality of expansive coil springs 109 which surround bolts 110 that extend through the clutch plates 97 and 98 and through slots 108S in the return plate in much the same manner as the bolts 101. Three such bolts 110 and springs 109 are afforded as will be evident in Fig. 3 of the drawings, and these bolts are held in place by the action of their heads 110H and nuts 110N.

In the operation of the transmission mechanism that has been described, the primary clutch 32 is, of course, in disengaged relationship when the engine 21E is stopped, and the engine 21E may be started through the use of a kick-starter mechanism 120 that is shown in Figs. 1 and 2. This kick-starter mechanism 120 has the starter shaft thereof aligned with the driving shaft 45, and the structure and operation of this starter mechanism is disclosed in my co-pending application, Serial No. 239,790, filed August 1, 1951, now Patent #2,642,055. After the engine 21E has been started as aforesaid, the shaft 45 and the driving member 32D of the clutch 32 are constantly rotated. So long as the engine 21E operates at or near its idling speed the rotative speed of the shaft 45 is insufficient to cause engagement of the primary clutch 32. The actual speed of engagement of this clutch may of course be selected at any predetermined figure, but for purposes of the present description it may be assumed that idling speed of the engine is such that the shaft 45 will operate at somewhat less than 300 R. P. M. Under such circumstances, the clutch 32 is arranged to engage when the speed of the shaft 45 is increased to somewhat over 300 R. P. M., and the engagement of the primary clutch 32 is in a practical sense, gradual so that the movement of the vehicle will be initiated in a smooth manner, and such smoothness of the vehicle starting movement is enhanced under the present invention by reason of the relatively low transmission ratio that is initially attained through the action of the variable speed unit 36.

When the shaft 35 is rotated by the engagement of the primary clutch 32, such rotation is effective through the planetary gear system to rotate the output element 37 at a greatly reduced speed as compared with the speed of the shaft 35. In the present instance the parts are proportioned to give approximately a three and one-half to one reduction. When the operating speed of the shaft 45 is maintained relatively close to the speed on which the primary clutch 32 has engaged, the reduced rotative speed of the output element 37 will be such that the friction clutch 69 will remain disengaged. When, however the engine speed is increased to such a point that the speed of the output element 37 is approximately 1100 R. P. M. the centrifugal force acting on the balls or weights 105 is sufficient to initiate outward radial displacement of the balls 105, and this initiates clutch engaging movement of the clutch element 98. As soon as there is a substantial frictional force acting between the clutch plates 97 and 98 on the one hand and the clutch element 60A, these forces tend to drive the ring gear housing 71 and the ring gear 70 in a forward direction, and such forward driving forces increase gradually as the speed of the output element increases. Thus, there will be some slippage in the clutch but the heat generated in such slippage is found to be unobjectionable since it is rapidly dissipated by the large area of the elements of the clutch 60. As the clutch engaging forces increase the clutch 60 finally reaches a fully engaged relationship where the ring gear 70 is driven as a unit with the output element 37 and when this condition obtains, there is a one to one drive relationship between the input or driving shaft 45 and the output element 37.

An important aspect of the present invention resides in the characteristic of the primary clutch 32 which causes this primary clutch to retain its engaged relationship when operating under load at low speeds. Another characteristic that is important in the present transmission is that when the elements of the transmission are at rest, the input shaft 45 is free and may be utilized in imparting starting forces to the engine 21E.

It will also be observed that due to the possibility of slippage in the clutch 60, the present transmission is in effect load controlled to a substantial degree, and for this reason it has been found that highly satisfactory acceleration characteristics are attained despite widely varying conditions of load.

From the foregoing disclosure, it will be apparent that the present invention affords an improved power transmission mechanism that is simple in character and which is adapted for use in those situations where the space limitations are quite restrictive. Moreover, this transmission mechanism of the present invention affords a load responsive variable ratio in the drive so as to thereby improve the overall performance characteristics of the power unit, even though a relatively small driving engine 21E is utilized.

Thus, while I have illustrated and described the preferred embodiment of my invention, it is to be understood that there is capable of variation and modification, and I therefore do not wish to be limited to the precise details set forth, but desire to avail myself of such changes and alterations as fall within the purview of the following claims.

I claim:

1. In a variable speed transmission, a main bearing sleeve, a main drive shaft mounted concentrically in said bearing sleeve and adapted to be rotated in a forward direction, a driven member arranged coaxially with the out-put end of said drive shaft and including a carrier for planet gears arranged concentrically about a portion of said drive shaft and in a rotative relation thereto, a sun gear fixed to and rotatable with said drive shaft, planet gears journaled on said carrier in mesh with said sun gear, a ring gear encircling and meshed with the planet gears and constituting a track about which the planet gears may be revolvably driven as a unit by the sun gear to transmit motion from the drive shaft to said driven member and the planet carrier at a reduced speed relative to said drive shaft when said ring gear is held against rotation in a reverse direction, a cup-shaped housing mounted concentrically about and rotatably relative to said driven member and main bearing sleeve and having an annular extension surrounding the ring gear to which the ring gear is connected for rotation therewith, means acting between said ring gear housing and an abutment ring carried by said main bearing sleeve to hold said ring gear housing and the ring gear against rotation only in a reverse direction so as to constitute the ring gear a track for the planet gears revolving as a unit as aforesaid, one disc-like clutch element fixed to and extended radially outwardly of the outer side of the ring gear housing, another clutch element fixed to said driven member for rotation therewith and including a pair of spaced co-axial disc-like plates disposed on opposite sides of the first-named clutch element adapted to engage the same and cause the ring gear and housing therefor to rotate with said driven member, said other clutch element also including a plate spaced from said pair of annular plates to form a clutch housing in which are located a plurality of centrifugally actuatable balls adapted to move radially outwardly within said housing therefor when the second-named clutch element rotates with said driven member, and a cam surface afforded on the last-named plate adapted to so cam said balls in their radial outward movement within said housing as to cause the second-named clutch element to gradually engage the first-named clutch element and thereby cause the ring gear and its housing to rotate in a forward direction with the planet carrier to couple the driven member to said main drive shaft in a one-to-one driving relation.

2. In a variable speed transmission, a main bearing sleeve, a main drive shaft mounted concentrically in said bearing sleeve and adapted to be rotated in a forward direction from a main source of power, a driven member arranged coaxially with the front or out-put end of said drive shaft and including a carrier for planet gears arranged concentrically about a portion of said drive shaft in a rotative relation thereto, a sun gear carried by said drive shaft to rotate therewith in a forward direction, planet gears rotatably mounted on said carrier and in mesh with said sun gear so as to be rotated in a reverse direction by the sun gear, a ring gear encircling and in mesh with the planet gears so as to tend to rotate in a reverse direction with said planet gears, a cup-shaped housing supported on said driven member and said main bearing sleeve so as to surround the ring gear, means affording a connection between the ring gear and said housing so that the two are rotatably interconnected, a toothed ring carried by said main bearing sleeve, a plurality of pawls mounted in said housing and adapted to engage said toothed ring to hold said housing and the ring gear therewith against rotation only in a reverse direction so as to constitute the ring gear a track about which the planet gears may revolvably travel as a unit in a forward direction with the sun gear to couple the drive shaft and driven member in a speed reducing relation, one clutch element fixed to and projecting radially outwardly of the outer side of the ring gear housing, another clutch element carried by said driven member for rotation therewith and including a pair of spaced front and rear plates disposed on the front and rear sides of the first-named clutch element to engage the same and cause the ring gear and its housing to rotate in a forward direction with said driven member, said other clutch element also including an additional plate spaced from one of said pair of plates to form a housing in which are located a plurality of centrifugally actuatable balls adapted to move radially outwardly within said housing therefor when the second-named clutch element is driven with said driven member, the last-named plate including a cam means adapted to cam said balls in their radial outward movement against said one of said pair of plates so as to cause said pair of plates included in the second-named clutch element to gradually engage the first-named clutch element and thereby rotate the ring gear and its housing in a forward direction to couple the driven member to said main drive shaft in a one-to-one driving relation.

References Cited in the file of this patent

UNITED STATES PATENTS

| Number | Name | Date |
|---|---|---|
| 834,592 | Sturtevant | Oct. 30, 1906 |
| 1,082,028 | Jones et al. | Dec. 23, 1913 |
| 1,416,996 | Stucatur | May 23, 1922 |
| 1,526,949 | Barenyi | Feb. 17, 1925 |
| 1,559,259 | Knapp | Oct. 27, 1925 |
| 1,741,853 | Lyman | Dec. 31, 1929 |
| 1,781,925 | Johnson | Nov. 18, 1930 |
| 2,007,304 | Padgett | July 9, 1935 |
| 2,056,050 | Harris | Sept. 29, 1936 |
| 2,151,950 | Tyler | Mar. 28, 1939 |
| 2,445,482 | Hodgson | July 20, 1948 |